United States Patent [19]

Masom

[11] Patent Number: 5,044,771

[45] Date of Patent: Sep. 3, 1991

[54] LOCKING MECHANISM FOR PYROMETERS

[75] Inventor: Ronald A. Masom, Southampton, England

[73] Assignee: Smiths Industries Public Limited Company, London, England

[21] Appl. No.: 588,551

[22] Filed: Sep. 26, 1990

[30] Foreign Application Priority Data

Oct. 17, 1989 [GB] United Kingdom ............... 8923326

[51] Int. Cl.$^5$ .............................................. G01K 1/14
[52] U.S. Cl. .................................. 374/208; 70/174; 356/241; 403/336
[58] Field of Search ............... 374/208; 411/987, 320; 356/241

[56] References Cited

U.S. PATENT DOCUMENTS

| 134,990 | 1/1873 | Hood | 411/987 X |
|---|---|---|---|
| 2,329,685 | 9/1943 | Baker | 374/208 |
| 2,652,740 | 9/1953 | Fruth | 411/363 |
| 4,037,980 | 7/1977 | Haentjens | 411/98 X |
| 4,690,570 | 9/1987 | Wall | 374/188 |
| 4,860,732 | 8/1989 | Hasegawa et al. | 356/241 X |

FOREIGN PATENT DOCUMENTS

| 350192 | 6/1931 | United Kingdom . |
| 594550 | 11/1947 | United Kingdom . |
| 846822 | 8/1960 | United Kingdom . |
| 957860 | 5/1964 | United Kingdom . |
| 1540026 | 2/1979 | United Kingdom . |

Primary Examiner—Daniel M. Yasich
Attorney, Agent, or Firm—Pollock, Vande Sande and Priddy

[57] ABSTRACT

A pyrometer has a lock nut that engages a threaded sighting tube. The lock nut has a flange with a circle of thirteen apertures. A second similar flange is mounted on the body of the pyrometer which is restrained from rotation by splines which engage splines in the sighting tube. The second flange has a circle of only twelve apertures which is concentric with the circle of apertures on the first flange. The two flanges are locked together and the pyrometer is thereby locked in the sighting tube by means of a split pin pushed through aligned apertures. The different number of apertures in the flanges gives a number of locking positions that exceeds the number of apertures.

2 Claims, 1 Drawing Sheet

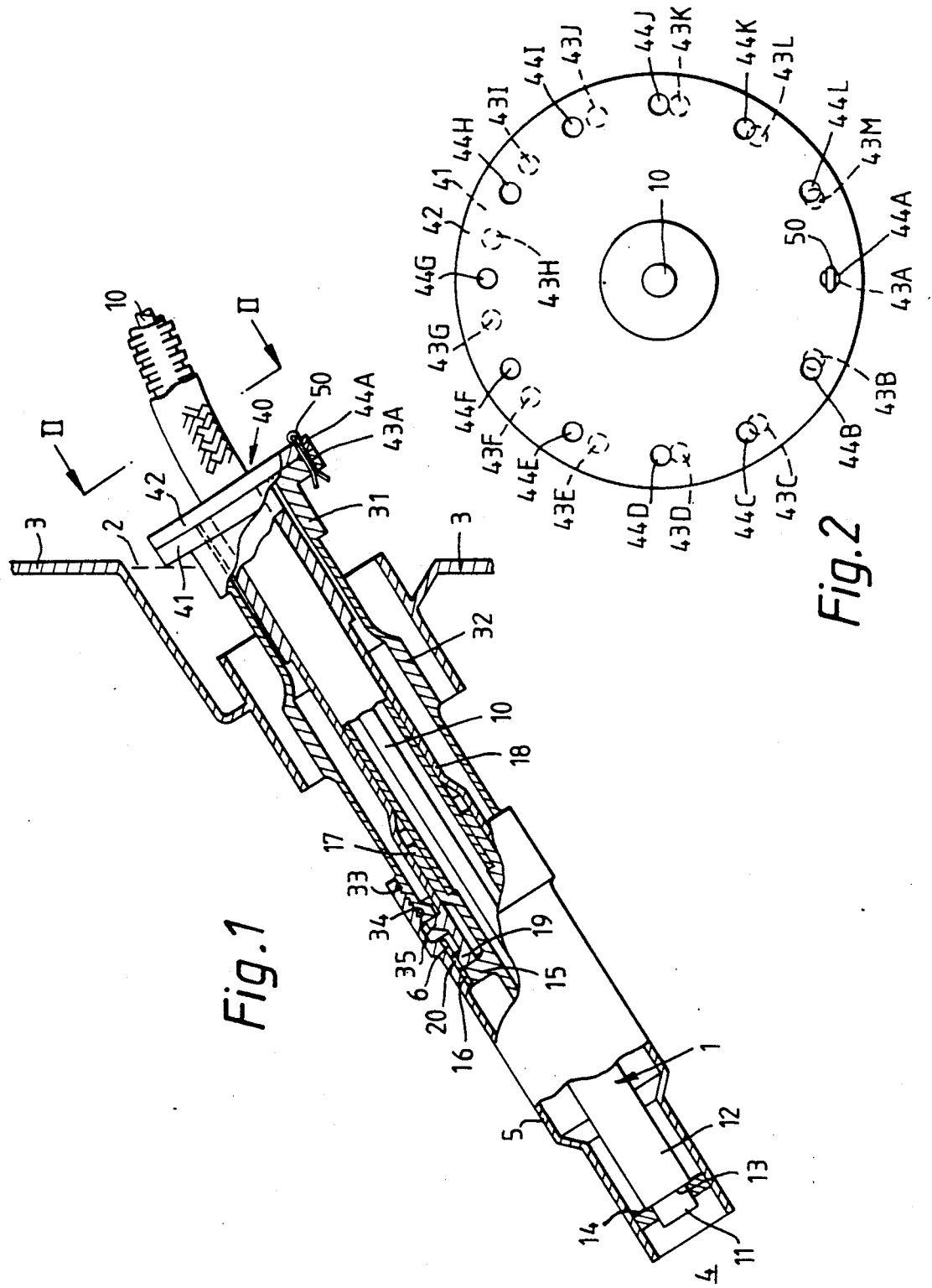

LOCKING MECHANISM FOR PYROMETERS

BACKGROUND OF THE INVENTION

This invention relates to locking mechanisms.

The invention is more particularly concerned with locking mechanisms to prevent rotation of a rotatable nut, or similar component after it has been used to draw two parts into engagement with one another, such as a pyrometer in a sighting tube.

In many applications, such as on vehicles subject to vibration, it is important to be able to lock together two parts, such as mating parts of electrical connectors or the like. In one particular application, optical pyrometers are drawn into position in a sighting tube that extends into the combustion chamber of a gas-turbine engine by means of a screw-threaded nut. Once the nut has been tightened, it is locked in place by means of a length of wire. Although this arrangement is generally secure, it has several disadvantages. The use of wire can make removal and maintenance difficult when the engineer is wearing heavy gloves. Gloves are often needed, such as when the equipment is hot or when the engineer is working in hazardous or potentially hazardous environments. Wire can also puncture gloves, exposing the engineer to the hazardous environment.

BRIEF SUMMARY OF THE INVENTION

It is an object of the present invention to provide a locking mechanism that can be used to avoid these difficulties.

According to one aspect of the present invention there is provided a locking mechanism having first and second parts that are displaceable relative to one another and which can be locked together at a plurality of relative displacements, both the first and second parts having a plurality of surface formations spaced apart from one another along the direction of relative displacement, and the spacing of the surface formations of the second part differing from that of the surface formations of the first part such that different ones of the surface formations on the first part will align with different ones of the surface formations on the second part at different relative displacements and such that, by locking aligning surface formations with one another, the first and second parts can be locked in a number of different relative displacements that exceeds the number of surface formations on the first or second part.

The first and second parts are preferably rotatable relative to one another, the surface formations being arranged in respective circles. The first and second parts may be radially extending flanges. The surface formations are preferably apertures and may be locked by means of a pin member extending through the aligned apertures. The pin member may be a split pin. Preferably for each locking position only one of the surface formations on the first part is aligned with one of the surface formations on the second part.

According to another aspect of the present invention there is provided a pyrometer including a locking mechanism according to the above one aspect of the invention.

The first and second parts are preferably rotatable relative to one another, the first part being coupled to a screw-threaded member that is engageable with a screw-threaded tube, and the second part being restrained from rotation such that when the first and second parts are locked together the pyrometer is locked in position.

A locking mechanism for a pyrometer in accordance with the present invention will now be described, by way of example, with reference to the accompanying drawings.

BRIEF DESCRIPTION OF THE DRAWINGS

FIG. 1 is a partly sectional side elevation view of the pyrometer; and

FIG. 2 is a cross sectional view along the line II—II of FIG. 1.

DETAILED DESCRIPTION OF PREFERRED EMBODIMENT

The pyrometer 1 extends through an aperture 2 in the wall 3 of a gas-turbine engine combustion chamber 4 and projects within a sighting tube 5 that is directed at the region of the combustion chamber the temperature of which is to be monitored.

The pyrometer 1 has a fibre-optic cable 10 which extends along its length to the temperature-responsive tip 11 of the pyrometer where a lens (not shown) is used to focus radiation from the combustion chamber 4 onto the cable. The cable 10 extends to a remote detector (not shown) which provides an electrical output, in the usual way, indicative of radiation level.

At its forward end, the pyrometer 1 has a cylindrical, temperature-resistant shell 12 which encases the cable 10. The forward end of the shell 12 has a step 13 that locates on a step 14 formed at the forward end of the sighting tube 5. Close to its rear end, the shell 12 has a radial flange 15 provided with axial splines or similar shapes 16 around its periphery which engage cooperating splines 6 on the inside of the rear end of the sighting tube 5. Rearwardly of the flange 15, the shell 12 is formed into a neck 17 which projects within the forward end of a rear sleeve or body 18. The forward end of the body 18 has a radially-projecting lip 19 which abuts the flange 15 on the shell 12 and which has splines or similar shapes 20 around its periphery which engage the splines 6 on the sighting tube. Alternative arrangements can be used to prevent rotation of the shell 12 in the sighting tube 5.

At its rear end, the body 18 supports one half of a locking mechanism 40 the other half of which is provided at the rear end of a lock nut 31. The lock nut 31 takes the form of a cylindrical sleeve 32 which has a screw thread 33 around the outside of its forward end which engages a screw thread 34 on the inside of the rear end of the sighting tube 5. The forward end of the lock nut sleeve 32 abuts against a flange 35 close to the forward end of the body 18. At its rear end, the lock nut 31 has a radially extending flange 41 which, together with a similar flange 42 secured to the body 18, provides the locking mechanism 40. The two flanges 41 and 42 are of circular shape having the same external diameter and have opposed faces which contact one another.

With reference now to FIG. 2, each flange 41 and 42 is provided with a row of surface formations in the form of apertures arranged in respective circles concentric of the flanges 41 and 42 and their axis of rotation. The lock nut flange 41 has thirteen apertures, indicated by the broken circles 43A to 43M, equally spaced from one another around a circle, whereas the flange 42 on the body 18 has only twelve apertures 44A to 44L equally spaced around a concentric circle of the same diameter. In any relative angular orientation of the two flanges 41 and 42, only one aperture on one flange can align with an aperture on the other flange. In the position shown in FIG. 2, the aperture 44A on the flange 42 is shown aligned with the aperture 43A on the flange 41. The two flanges 41 and 42, and hence the lock nut 31 and body 18, are locked together in this position by means of a split pin 50 inserted through the aligned apertures 44A and 43A. All the other apertures will be out of alignment because the spacing between adjacent apertures on each flange is different. In this way, the two sets of apertures act in a Vernier fashion to increase the number of different relative positions in which an aperture in one flange will align with an aperture in other flange.

The angular spacing between adjacent apertures on the flange 41 is 360/13=27.69°, whereas the spacing between apertures on the flange 42 is 360/12=30°. The angular spacing, therefore, between different lockable positions is 30−27.69=2.31° so that, in all, there are 360/2.31=156 different lockable positions for each turn of the lock nut 31. In this way, the lock nut 31 can be tightened in the usual way to the desired degree of tightness and can then be locked by further tightening or releasing the lock nut by, at most 2.31°/2=1.16°. The split pin 50 provides a simple, secure and visible means of locking which can be manipulated relatively easily in gloved hands.

It will be appreciated that, instead of using apertures in the two flanges, alternative surface formations could be used, such as edge castellations arranged in a similar Vernier fashion.

The invention could also be used to lock together two parts that can be displaced relative to one another along a straight line. In this case, the apertures, or other surface formations, would be arranged in a straight line along the direction of displacement.

What I claim is:

1. A pyrometer for mounting with a screw-threaded sleeve, the pyrometer comprising a body portion, the body portion including temperature-responsive means; and a lock nut, the lock nut being rotatable relative to the body portion, the lock nut being screw-threaded for engagement with the sleeve, the body portion being shaped to engage with the sleeve to prevent rotation of the body portion relative to the sleeve, wherein the lock nut and body portion both have a plurality of surface formations, wherein the surface formations of both the lock nut and body portion are spaced apart from one another in respective circles around an axis of rotation of the lock nut relative to the body portion, wherein the spacing of the surface formations of the body portion differs from that of the surface formations on the lock nut such that different ones of the surface formations of the lock nut will align with different ones of the surface formations of the body portion at different rotational positions, and wherein the pyrometer includes means for locking aligned surface formations with one another, such that the lock nut and body portion can be locked in a number of different rotational positions that exceeds the number of surface formations of the lock nut or body portion and such that when the lock nut is locked with the body portion the pyrometer is locked with the sleeve.

2. A pyrometer according to claim 1, wherein the lock nut and the body portion both have respective radial flanges, wherein the surface formations are provided by apertures around the respective flanges, and wherein the means for locking aligning surface formations with one another is a pin that extends through the aligned apertures.

* * * * *